United States Patent Office 3,600,200
Patented Aug. 17, 1971

3,600,200
METHOD OF PRESERVING FROZEN FRESH RED MEAT
Harry F. Bernholdt, Park Forest, and Harry L. Roschen, Forest Park, Ill., assignors to Swift & Company, Chicago, Ill.
No Drawing. Filed Dec. 26, 1968, Ser. No. 787,239
Int. Cl. A23b 1/00
U.S. Cl. 99—194                                    8 Claims

ABSTRACT OF THE DISCLOSURE

A process for preserving frozen red meat cuts so that they may be displayed under relatively high light intensities for prolonged periods of time without discoloration is set forth.

---

This invention relates to the preservation and packaging of meat cuts or meat products and, more particularly, to the prevention of light discoloration of frozen red meats packaged in transparent film.

Only a small part of the total meat production in this country results in frozen meat cuts that are available to the consumer. Those that are available in frozen form are generally packaged in opaque film so as to prevent, or at least inhibit, light-induced discoloration. Yet is is a fact that the meat industry, both wholesale and retail are in general agreement that eventually the majority of meat cuts will be sold in the frozen form. Figures now available show that over 75% of the consumers today, who buy fresh meat, put some in their freezers for later use. In this connection, the purchaser of a meat cut or product is greatly influenced by the color appearance of the product and it no doubt follows that the quantity of frozen retail meat sold could be increased substantially if the product were displayed in transparent wrappers.

In the production of frozen meats, the product is subjected to temperatures of around −10 to −30° F. to set the structure of the meat product and guard against deterioration in flavor, color, odor and quality. Freezing is carried out at low temperatures so as to convert the product from the flaccid, yielding state to a hard, rigid, brittle block or chunk and the freezing step is usually carried out as rapidly as possible. Rapid freezing is considered desirable since slow freezing tends to cause darkening of the meat. Since this rapid freezing is often carried out by blasting or blowing cold air over the surface of the product, and such procedure usually results in the evaporation of moisture from the meat, it has been the practice to carry out the freezing step after the meat has been enclosed in a covering or wrapping material which will inhibit dehydration of the meat and the resultant "freezer burn."

Even in those cases where the wrapper or covering material does prevent freezer burn, there is often a loss of the desirable red meat color since many flexible packaging materials which are employed to prevent evaporation of moisture also inhibit the transmission of oxygen. It is important, if the bright red meat color is to be developed, that the meat be in contact with oxygen and/or prior to the freezing step, in order to produce a desirable "bloom."

More importantly, it has been known for quite some time that frozen meat tends to discolor much more rapidly than fresh meat when exposed to light. Generally speaking, the discoloration of fresh meat is due primarily to bacterial action and not lighting. On the other hand, frozen red meat in approximately 0° F. freezer display cases under lighting of about 50–150 foot-candles of intensity have been known to discolor in four or less days. This discoloration appears to be a light catalyzed oxidation of the meat pigments and it appears that the bright cherry red color which is desirable (oxymyoglobin) becomes oxidized to the objectionable, at least from a marketing standpoint, brown (metmyoglobin).

It is, therefore, an object of this invention to provide a method for producing packaged frozen meat cuts or products whereby color, quality, and attractiveness of the meat are retained substantially undiminished even though the meat is subjected to various light intensities.

Additional objects if not set forth herein, will be readily apparent to those skilled in the art from a reading of the detailed description of the invention which follows.

It has now been discovered that the color (i.e. the bright red of the oxymyoglobin) of frozen meat may be protected considerably beyond that period which is presently possible even though exposed to light intensities of up to about 200 foot-candles by means of the addition of a very small but effective amount of nicotinic acid or its equivalent water soluble salt such as the alkali metal salts, particularly the sodium salt. The invention concerns a method for handling meat cuts or products which are to be marketed in a frozen condition and comprises a series of steps which insure the production of a unitary package containing the product that retains its natural cherry red color for a considerable period of time.

In accordance with the method of this invention, an individual meat cut, for example, a steak, chop or roast, is contacted with small amounts of nicotinic acid usually by spraying a dilute aqueous solution of the acid onto the meat. The meat cut is then wrapped in a flexible transparent film having an oxygen permeability of at least 200 cc./100 sq. in. in 24 hours 173° F. and 50% relative humidity, preferably at least 500 cc./100 sq. in. in 24 hours at one atmosphere differential in order to assure good color during subsequent handling, freezing and marketing. The wrapped product is then sealed under vacuum in order to exclude entrapped air thereby eliminating objectionable frost pockets. Normally, the wrapped product is frozen, placed on a tray and wrapped with a flexible netting and placed in a box for shipment. Alternatively, the wrapped product can be placed on a retail-type meat tray and over-wrapped with netting or other high oxygen transmission film prior to freezing. Following wrapping, the product is then cryogenically frozen using a liquid nitrogen freezer tunnel, although other systems such as a plate or conventional freezers can be used. In fact any type of freezing means may be used that possesses sufficient refrigeration capability to freeze the meat without formation of damaging ice crystals. During subsequent marketing of the product, the meat can be displayed in cases at temperatures below about 10° F., preferably below 0° F., under lighting of about 50–150 foot-candles of intensity without showing discoloration for several weeks.

It has been found that concentrations of nicotinic acid within the ranges of about 10 p.p.m. to 50 p.p.m. give optimum results. Since the nicotinic acid is present on the surface of the meat, at least about 35 p.p.m. of nicotinic acid should be present on a 1-inch thick steak. On larger cuts of meat, a 4-inch roast for example, the amount used, based on the total weight of the meat will be approximately ¼ of 35 p.p.m. or about 10 p.p.m. While larger amounts may be used, no added advantage is apparent inasmuch as levels of 100 p.p.m. result in no difference in product as compared to 50 p.p.m.

At this point, the instant invention should be contrasted with the procedure set forth in U.S. Pats. No. 2,541,572 and No. 2,491,646 which relate to the creation of unnatural or artificially bright red color to fresh meat by complete distribution of ascorbic acid alone or in combination with relatively large amounts of nicotinic acid throughout the meat mass. In order to create this artificial color, nicotinic acid in an amount of .3 gram (660 p.p.m.) per pound of meat, either alone or in combination with .05 gram of ascorbic acid, is required and the patentees specifically state that a substantial reduction in that amount results in inferior products. On the other hand, the method of the present invention does not relate to the creation of cherry red color in fresh red meat but relates to the prevention of light discoloration of frozen red meats.

At the levels used by the patentees, they appear to obtain a reaction pigment resulting from a complexing of the nicotinic acid with myoglobin thereby producing a bright red color. At levels used in the instant invention, this bright red color is not obtained and in fact, the pigment appears no different from that of the control (non-nicotinic acid treated) product. It is therefore postulated that at levels used merely for color stability in the instant process that there is a prevention of oxidation of the pigments to the meat state but not in sufficient quantity to produce a new reaction pigment and therefore it appears that there is a difference in the mechanism involved in providing the color stability. Hence, the levels of nicotinic acid which are suitable in the process of the instant invention, while generally about 35 p.p.m. may approach about 250 p.p.m. so that the levels are not sufficiently high to induce artificial coloration to the product.

In carrying out the process of this invention, no holding time is required, i.e. the nicotinic acid need not be worked into the meat as it is sufficient if the nicotinic acid merely coats the surface of meat. After contacting the meat with a small quantity of nicotinic acid, the product may be immediately frozen. In the alternative, the meat may be frozen prior to contact with the nicotinic acid but in such a procedure it is pointed out that adhesion of the acid to the meat is reduced somewhat.

In the description of the prior art processes for creation of artificial color by using nicotinic acid in fresh meat, it is indicated that the use of nicotinic acid alone (without ascorbic acid) shows best results when air is excluded from the meat. Hence in the prior art process when using only nicotinic acid to create color, the meat cut is wrapped or packaged in tightly fitting or sealed air-impermeable envelopes. Further, in the prior art process, it is mentioned that ascorbic acid may be used without nicotinic acid if oxygen is present and in that case the meat is wrapped in unsealed transparent wrappers. While the equivalency of nicotinic acid and ascorbic acid is set forth in the description of the processes relating to the creation of bright red color in meat, the equivalency stops short in regard to light stability of frozen meat inasmuch as small amounts of ascorbic acid do not provide satisfactory results in regard to inhibiting light discoloration of frozen meats that are subjected to light intensities of 50–150 foot-candes.

EXAMPLE I

Fresh beef steaks having a temperature of 35° F. and cut within 96 hours after slaughter were sprayed with an aqueous solution of 1% nicotinic acid with the resulting pickup of .5% (50 p.p.m.). They were then placed in polyethylene pouches and vacuum sealed to exclude entrapped air thereby eliminating objectionable frost pockets. The product was placed on a retail-type meat tray and overwrapped using netting to hold the product in place. The product was then cryogenically frozen using a liquid nitrogen freezer tunnel. The product was displayed in 0° F. freezer cases under lighting of about 150 foot-candles of intensity. The treated product retained its bright red color under these conditions for 40 days. Control samples i.e. not treated with nicotinic acid were observed to go off color in four days resulting in a very unsightly product.

EXAMPLE II

Fresh beef steaks having a temperature of 40° F. and cut within 96 hours after slaughter were sprayed with 1% nicotinic acid solution with a resulting gain of 0.35% (35 p.p.m. basis meat) in weight. These steaks were placed, sprayed face up, on paper board meat trays. Care was taken to have well filled packages and steaks were of sufficient thickness so that the nicotinic acid sprayed surfaces were higher than the package edges. The packages were then wrapped in transparent film with high oxygen transmission characteristics (1100 cc./100 sq. in./24 hr. at 1 atm. p.d.) and were passed through a heat shrink tunnel to securely bring the film tight around the package and eliminate air pockets. The package units were than frozen in an air blast at 500 ft./min. at a temperature of −20° F. Control packages were similarly prepared in identical fashion except that no nicotinic acid spray was employed.

The frozen packages were exposed to merchandising conditions in a lighted frozen food display case under 110 ft. candle fluorescent illumination. Control steaks developed unacceptable color in 6 days, while treated samples were still satisfactory in appearance after at least 20 days.

EXAMPLE III

Fresh cut pork loins were cut in chops and sprayed with a 1% nicotinic acid spray to a pick-up of .6%, or approximately 60 p.p.m. Comparable chops, taken from the same loin, were used as controls and were not sprayed with nicotinic acid. Following treatment, the product was frozen in a blast freezer and subsequently placed in a freezer display case at −10° F. and 200 ft. candles of light. Results are indicated in Table 1.

TABLE 1.—NICOTINIC ACID TREATMENT OF PORK LOIN CHOPS FOR EXTENSION OF COLOR STABILITY UNDER FROZEN DISPLAY CASE LIGHTING

| Product | Treatment | Color evaluation [1] | | | | | | | | |
|---|---|---|---|---|---|---|---|---|---|---|
| | | Days of light exposure | | | | | | | | |
| | | 0 | 1 | 4 | 5 | 8 | 14 | 22 | 36 | 48 |
| Pork loin chops | Control | 8.0 | 7.0 | 6.0 | 6.0 | 4.0 | 3.0 | 2.0 | 2.0 | 2.0 |
| | 60 p.p.m. nicotinic acid | 8.0 | 7.5 | 7.0 | 7.0 | 7.0 | 7.0 | 7.0 | 7.0 | 7.0 |

[1] Based on a 1–10 scale where 10=excellent and 1=very poor.

EXAMPLE IV

Lamb loins were cut into chops and randomly distributed to control and nicotinic acid sprayed product. Nicotinic acid treated chops were sprayed with a 1% nicotinic acid solution in sufficient quantity to moisten the surface. This resulted in a pick-up of .5% or approximately 50 p.p.m. Following treatment, the control and nicotinic acid sprayed chops were frozen in a plate freezer and subsequently placed in a freezer display case at −10° F. and 150 ft. candles of light. Results of this study are indicated in Table 2 and demonstrate the effectiveness of nicotinic acid in the extension of color stability of frozen red meats held in transparent packages under display case lighting.

TABLE 2.—NICOTINIC ACID TREATMENT OF LAMB LOIN CHOPS FOR EXTENSION OF COLOR STABILITY UNDER FROZEN DISPLAY CASE LIGHTING

| Product | Treatment | Color evaluation [1] Days of light exposure | | | | | | | |
|---|---|---|---|---|---|---|---|---|---|
| | | 0 | 1 | 4 | 8 | 14 | 22 | 36 | 48 |
| Lamb loin chops | Control | 9.0 | 7.0 | 6.5 | 6.0 | 5.5 | 5.0 | 4.0 | 4.0 |
| | 50 p.p.m. nicotinic acid | 9.0 | 8.0 | 7.0 | 7.0 | 7.0 | 7.0 | 7.0 | 7.0 |

[1] Same as in Table 1.

EXAMPLE V

Veal shoulder chops were randomly distributed to control and nicotinic acid spray treatment. The nicotinic acid sprayed chops were treated with a 1% nicotinic acid spray in sufficient quantity to moisten the surface. This resulted in a pick-up of .45%, or approximately 45 p.p.m. Following treatment the control and nicotinic acid sprayed chops were frozen at 0° F. and subsequently placed in a freezer display case at −10° F. under 100 ft. candles of light. Results are demonstrated in Table 3 and illustrate the effectiveness of nicotinic acid in extension of color stability of frozen red meats when exposed to display case lighting in transparent packages.

TABLE 3.—NICOTINIC ACID TREATMENT OF VEAL SHOULDER CHOPS FOR EXTENSION OF COLOR STABILITY UNDER FROZEN DISPLAY CASE LIGHTING

| Product | Treatment | Color evaluation [1] Days of light exposure | | | | | | | |
|---|---|---|---|---|---|---|---|---|---|
| | | 0 | 1 | 4 | 5 | 8 | 14 | 22 | 36 | 48 |
| Veal shoulder chops | Control | 8.0 | 7.5 | 7.0 | 6.5 | 6.0 | 6.0 | 5.0 | 4.0 | 3.0 |
| | 45 p.p.m. nicotinic acid | 8.0 | 7.5 | 7.5 | 7.5 | 7.0 | 7.0 | 7.0 | 7.0 | 7.0 |

[1] Same as in Table 1.

EXAMPLE VI (A) Boned, rolled and tied roasts weighing approximately 3.97 lbs. were sprayed with a 1% nicotinic acid solution. When the top surface only was sprayed with nicotinic acid, resulting pickup was .11%, or 11 p.p.m. When the entire tied surface, excluding the ends, was sprayed the resulting pickup was .22% or 22 p.p.m. When the whole tied surface and ends were sprayed resulting pickup was .55% or 55 p.p.m.

(B) A nicotinic acid treatment of a flat pot roast weighing 4.05 lbs. was sprayed with a 1% nicotinic acid solution.

In this case, when the top surface only was sprayed, the resulting pickup was .11% or 11 p.p.m. However, when both the top and exposed sides were sprayed the resulting pickup was .33% or 33 p.p.m.

From the foregoing, it is evident that size and shape of the roast will be a factor and in the case of a boned, rolled and tied roast, one could have as little as about .11% pickup. However, in this case it is preferred that one would spray the entire tied surface, plus one end and the pickup would more nearly approach the 55 p.p.m. level. In the case of the flat roast, one would spray the top and sides and, therefore, would have a pickup of approximately 33 p.p.m.

Obviously, many modifications and variations of the invention as hereinbefore set forth may be made without departing from the spirit and scope thereof, and therefore only such limitations should be imposed as are indicated in the appended claims.

We claim:

1. A method for preserving the color of frozen fresh red meat to be displayed in a transparent, oxygen permeable film under relatively high light intensities which comprises treating the surface of the fresh red meat with nicotinic acid in an amount of between about 10 p.p.m. and 250 p.p.m., freezing and packaging the meat to produce a product that has prolonged color stability even though subjected to high light intensities.

2. The method of claim 1 wherein the nicotinic acid is present on the meat in an amount of between about 10 p.p.m. and about 100 p.p.m.

3. The process of claim 1 wherein the meat is frozen before being treated with the nicotinic acid.

4. A packaged frozen fresh red meat product protected against relatively high light intensity discoloration comprising a frozen meat cut or frozen meat product having about 10 p.p.m. to about 250 p.p.m. of nicotinic acid present thereon, said frozen meat being encased in a transparent, oxygen permeable film.

5. The product of claim 4 wherein the nicotinic acid is present in an amount of between about 10 p.p.m. and about 100 p.p.m.

6. The product of claim 4 wherein the frozen meat is selected from the group consisting of beef, pork, lamb and veal and contains about 10 p.p.m. to about 50 p.p.m. of nicotinic acid.

7. The product of claim 4 wherein the meat is treated with nicotinic acid such that about 35 p.p.m. to about 50 p.p.m. of nicotinic acid remains on the meat and the meat is encased in a flexible transparent film having an oxygen permeability of at least 200 cc./100 sq. in. in 24 hours/73° F. and 50% relative humidity.

8. The product of claim 4 wherein the product retains its color stability for at least 20 days.

References Cited
UNITED STATES PATENTS 2,491,646  12/1949  Coleman et al. _____ 99—157X
2,988,452  6/1961  Cameron _____ 99—194

HYMAN LORD, Primary Examiner

U.S. Cl. X.R.

99—157